United States Patent [19]
Knight et al.

[11] Patent Number: 5,623,830
[45] Date of Patent: Apr. 29, 1997

[54] METHOD AND APPARATUS FOR FREEZING A FOOD PRODUCT IN A PREDETERMINED SHAPE

[75] Inventors: Robert J. Knight, Acworth; Simon J. Shamoun, Kennesaw; Jay R. Amber, Woodstock; Donald W. Black, Simon's Island, all of Ga.

[73] Assignee: The BOC group, Inc., Murray Hill, N.J.

[21] Appl. No.: 593,179

[22] Filed: Feb. 22, 1996

Related U.S. Application Data

[63] Continuation-in-part of Ser. No. 418,198, Apr. 7, 1995, abandoned.
[51] Int. Cl.$^6$ .................................................. F25D 13/06
[52] U.S. Cl. ............................................. 62/63; 62/346
[58] Field of Search .................................. 62/63, 346, 374, 62/381

[56] References Cited

U.S. PATENT DOCUMENTS

| | | | |
|---|---|---|---|
| 3,048,987 | 8/1962 | Wentworth | 62/381 |
| 4,107,938 | 8/1978 | Sollich | 62/346 |
| 4,301,659 | 11/1981 | Martin et al. | 62/63 |

*Primary Examiner*—Ronald C. Capossela
*Attorney, Agent, or Firm*—R. Hain Swope; Salvatore P. Pace

[57] ABSTRACT

Method and apparatus for changing or maintaining the shape of a food product during freezing using a roller assembly containing at least two rollers forming a sinusoidal pathway in which the food product is submerged in a liquid cryogen as the shape-forming operation is completed.

29 Claims, 3 Drawing Sheets

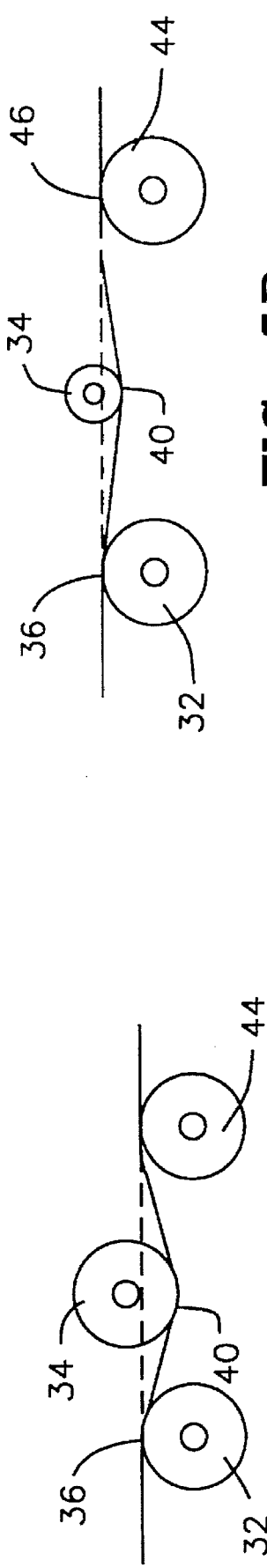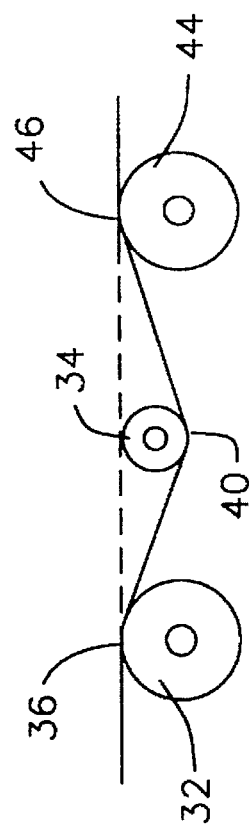

METHOD AND APPARATUS FOR FREEZING A FOOD PRODUCT IN A PREDETERMINED SHAPE

RELATED APPLICATION

This is a continuation-in-part application of U.S. Ser. No. 08/418,198 filed on Apr. 7, 1995, now abandoned.

FIELD OF THE INVENTION

The present invention is generally directed to a method and apparatus for at least partially freezing a food product in a predetermined shape by employing a roller assembly within a vessel containing a liquid cryogen.

BACKGROUND OF THE PRIOR ART

Commercial freezers employing a liquid cryogen are customarily used to freeze food products such as fruits, vegetables, poultry, seafood and the like. When an unfrozen food product is immersed in a cryogenic bath it immediately freezes in the shape that it enters the bath or, depending on the relative dimensions of the food product, may undergo a change in shape. The shape of a food product either before or after freezing begins may not be desirable. For example, shrimp which have a normally curly shape lose this shape when they undergo pre-freezing processing including peeling, deveining, butterflying, battering and breading. A curled shrimp product is more appealing than a straight or uncurled shrimp product and thus the loss of the curled shape may affect the commercial value of the food product. Similarly, some food products have a desirable linear shape, but begin to curl or otherwise lose their linear shape during pre-freezing processing.

Because processed food products become set into a fixed shape after freezing in a liquid cryogen, it would be beneficial to control or alter the shape of the food product prior to freezing.

Efforts at changing or maintaining the shape of food products during prefreezing processing have not been successful. It would therefore be a significant advance in the art of freezing food products to provide an effective means of changing or maintaining the shape of a food product prior to freezing. In particular, it would be especially beneficial to be able to straighten, curl or otherwise change the shape of food product into a preselected shape and then immediately freeze the food product so that the preselected shape is retained.

SUMMARY OF THE INVENTION

The present invention is generally directed to a method and apparatus for at least partially freezing a food product in a preselected shape. The invention makes use of a roller assembly within a vessel containing a liquid cryogen. The number and positioning of the rollers of the roller assembly can be adjusted to obtain the desired shape. Once the food product is processed into the desired shape the liquid cryogen is used to further freeze or chill the food product.

More specifically, the present invention is directed to a method and apparatus for at least partially freezing a food product in a preselected shape comprising:

a) transporting the food product on a conveyor belt to a vessel containing a liquid cryogen and a roller assembly;

b) before or during contact of the food product with the liquid cryogen, passing the food product on the conveyor belt into contact with the roller assembly to form the food product into the preselected shape; and c) contacting the food product on the conveyor belt with the liquid cryogen, wherein the food product is at least partially frozen in said preselected shape.

A preferred form of the invention comprises:

a) transporting the food product on a conveyor belt to a vessel containing a liquid cryogen and a roller assembly;

b) before or during contact of the food product with the liquid cryogen, passing the food product on the conveyor belt over a first roller of said roller assembly having an upper surface positioned above the surface of the liquid cryogen; and c) passing the food product on the conveyor belt downwardly into shape-forming contact with a bottom surface of a second roller of the roller assembly, said bottom surface of the second roller positioned below the surface of the liquid cryogen.

The present invention can be applied to different food products having a variety of shapes which improves appearance and facilitates packaging of the frozen food product.

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 5A is a side view of a still further embodiment of the invention in which the roller assembly includes three rollers with the middle roller being higher than the first and third rollers;

FIG. 5B is a side view of another embodiment of the invention similar to

FIG. 5A in which the middle roller has a smaller diameter than the first and third rollers; and FIG. 6 is a side view of a still further embodiment of the invention similar to FIG. 3 in which the middle roller has a smaller diameter than the first and third rollers and is particularly adapted for flattening food products.

DETAILED DESCRIPTION OF THE INVENTION

The present invention provides an arrangement of rollers within a liquid cryogen-containing vessel for shaping and then freezing the food product into a preselected shape. As used herein, the term "food product" shall mean all food products that may be shaped prior to freezing including both hard and soft food products. Examples of food products which may be processed in accordance with the invention include seafoods; such as shrimp, clams, fish and the like; meats and poultry including beef, veal, chicken and turkey; and vegetables such as string beans, carrots, celery and the like.

The term "preselected shape" is not limited and includes linear, curled, rounded, flattened and the like.

The present invention is preferably applied to commercial freezers which include immersion baths containing a liquid cryogen. The present invention is also applicable to immersion freezers that include a second cooling operation which may utilize cryogenic vapor from the immersion bath which is circulated to an adjacent cooling tunnel or other means of freezing. Such systems are well known in the art.

Figure 1:
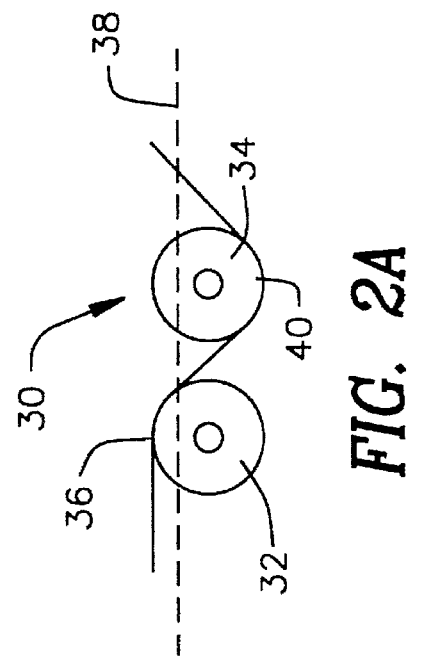
FIG. 1 is a schematic view of a conventional commercial freezer housing containing a single vessel containing a liquid cryogen.

Referring to FIG. 1 there is shown a conventional commercial freezer employing a single immersion bath. It should be noted that multiple freezers of various types may also be employed and such freezers are well known in the industry.

A commercial freezer shown generally by the numeral 2 includes a housing 4 defining a freezer section 6 having an entrance 8 for receiving unfrozen food product 10 and an exit 12 for delivering the frozen food product 14 for further processing and/or packaging. The unfrozen food product 10 enters the freezer section 6 on a conveyor belt 16 or by other suitable means and is transferred to a second conveyor belt 18 which is associated with a liquid cryogen immersion bath as explained hereinafter.

The conveyor belt 18 comprises an endless belt rotating about respective rollers 20a and 20b. A vessel 22 containing a liquid cryogen 24 is associated with the rollers 20a and 20b so that the conveyor belt 18 enters the liquid cryogen in proximity to the roller 20a and leaves the liquid cryogen in proximity to the roller 20b as shown specifically in FIG. 1.

The food resting on the conveyor belt 18 is immersed in the liquid cryogen and is at least partially frozen thereby. The frozen food product 14 moves over the roller 20b and is deposited on another conveyor belt 26 for removal from the freezer 2 through the exit 12.

In accordance with the present invention, the liquid cryogen containing vessel 22 is modified to house a roller assembly for shaping the food product in a preselected shape and then freezing the food product in the desired preselected shape (e.g. curled).

Figure 2A:
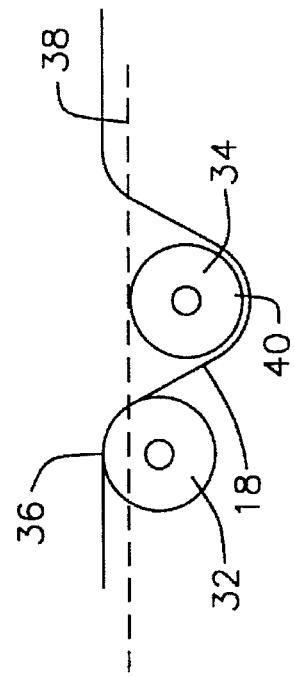
FIG. 2A is a side view of a first embodiment of the roller assembly of the present invention employing two rollers.

Referring to FIG. 2A there is shown a first embodiment of a roller assembly 30 comprising a first roller 32 and a second roller 34. Each is positioned proximate to each other so that the conveyor belt 18 forms a sinusoidal pathway for the food product to travel over the roller assembly 30. In particular, the food product travels over the first roller 32 and below the second roller 34 to form a curled food product. The rollers 32 and 34 extend transverse to the direction of travel of the conveyor belt 18 and are attached to or associated with the vessel 20.

The unfrozen food product 10 travels on the conveyor belt 18 around the upper surface 36 of the first roller 32 which lies above the surface 38 of the liquid cryogen. The food product then enters the liquid cryogen contained within the vessel 20 and very quickly is placed into contact with the bottom surface 40 of the second roller 34. Shaping of the food product 10 takes place as the food product travels in a sinusoidal pathway over the first roller 32 and around the second roller 34.

Figure 2B:
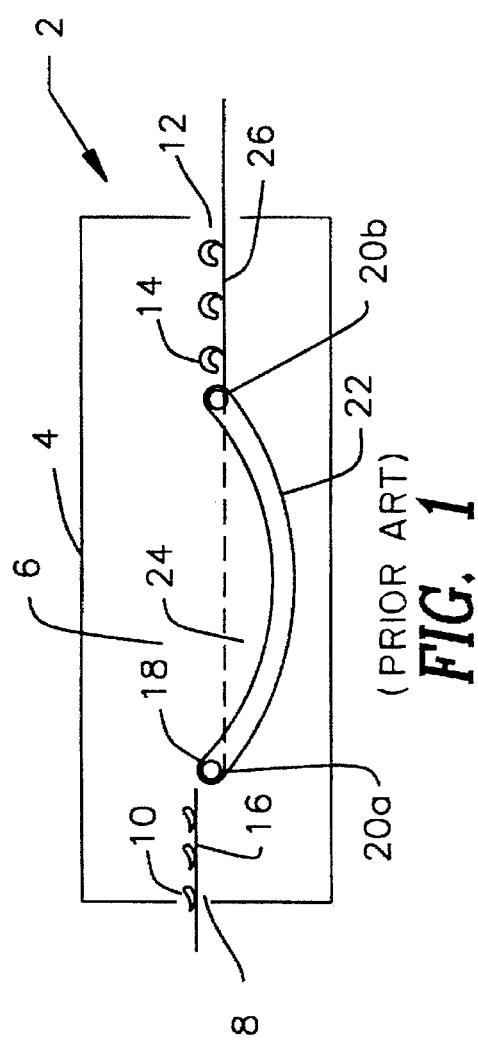
FIG. 2B is an enlarged view of the embodiment shown in FIG. 2A showing the food product under pressure between the conveyor belt and the second roller of the roller assembly.

Referring to FIG. 2B, pressure is applied to the food by the roller 34 and the conveyor belt 18 as the food product travels along the sinusoidal pathway.

The pressure exerted on the food product between the second roller 34 and the conveyor belt 18 in part determines the shape of the food product as it commences freezing. Accordingly, the distance between the second roller 34 and the conveyor belt 18 can be adjusted depending on the thickness of the food product. Typically the distance between the second roller 34 and the conveyor belt is set to approximate the thickness of the food product plus a slight clearance on the order of about 1/16 inch. For example, if a food product has a thickness of about 3/8 inch, the distance between the roller 34 and the conveyor belt 18 could be set at about 7/16 inch. It should be understood that the clearance between the second roller 34 and the conveyor belt 18 can vary from product to product.

Figure 2C:
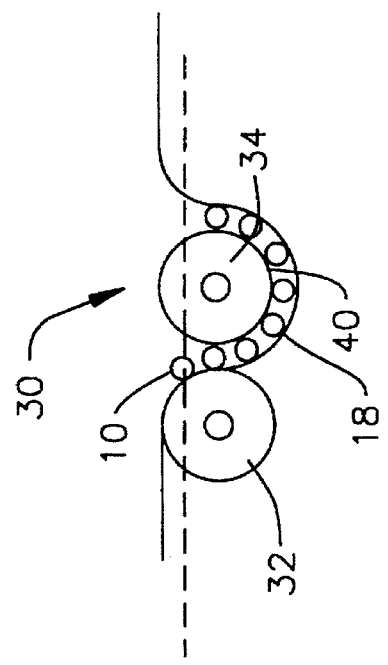
FIG. 2C is a side view of an embodiment of the roller assembly of the present invention employing two rollers wherein the second roller is lower than the first roller.

The position of the second roller may be lowered with the immersion bath to effect a greater degree of curling. Referring to FIG. 2C, the second roller is lowered so that a greater portion thereof is immersed with the bath of liquid cryogen. The travel path of the food product from the first roller 32 to the second roller 40 is thereby extended as is the residence time of the food product within the liquid cryogen. In this embodiment of the invention, a greater degree of curling can be imparted to the food product as compared with the embodiment of FIG. 2A, assuming that the conveyor belt is travelling at the same rate of speed.

Figure 3:
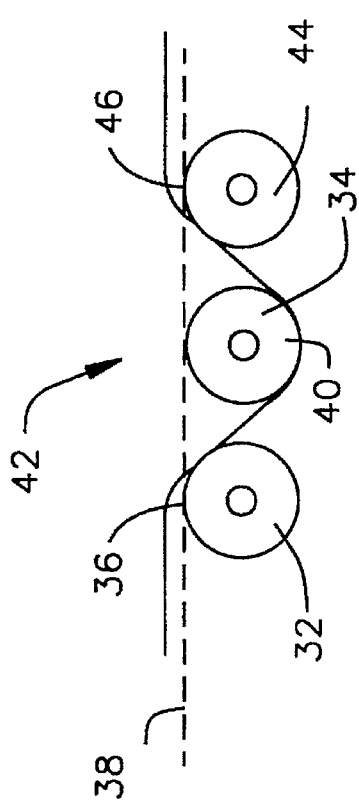
FIG. 3 is a side view of another embodiment of the present invention employing three rollers arranged linearly which is particularly adapted for freezing a food product in a linear shape.

The rollers of the roller assembly can comprise more than two rollers. For example, three rollers arranged linearly may be employed to provide a relatively linear-shaped food product. Referring to FIG. 3, there is shown a roller assembly 42 having an arrangement of three rollers 32, 34 and 44, respectively. The three rollers define a sinusoidal pathway for the movement of the food product over the upper surface 36 of the first roller 32, below the bottom surface 40 of the second roller 34 and over the upper surface 46 of the third roller 44. In this embodiment, the food product assumes a linear configuration as it becomes frozen through contact with the liquid cryogen.

The shape of the food product can be altered by lowering the second roller 34 relative to the first and third rollers 32 and 44, respectively. In this manner, it is possible to impart a curled shape to the food product as previously described in connection with FIGS. 2A and 2C. The degree of curling is dependent on the diameter of the rollers and the arrangement of the rollers (e.g. the relative positioning of the rollers). In general, a greater degree of curling can be obtained by moving the middle roller downwardly further away from the first and second rollers. In addition, greater curling can be obtained by reducing the diameter of the middle roller relative to the diameters of the first and third rollers. Conversely, as the middle roller is positioned closer to the same level as the first and third rollers, the food product will tend to attain a more linear shape. Similarly, as the diameter of the middle roller approaches the diameter of the first and third rollers, the degree of curling will decrease (i.e. the food product will obtain a linear shape).

Figure 4A:
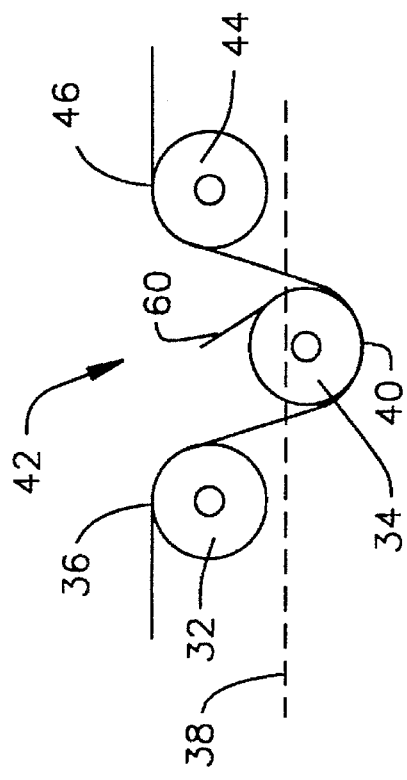
FIG. 4A is a side view of a still further embodiment of the invention employing three rollers with the middle roller lying below the level of the first and third rollers, said arrangement being particularly adapted for freezing a food product in a curled shape.
Figure 4C:
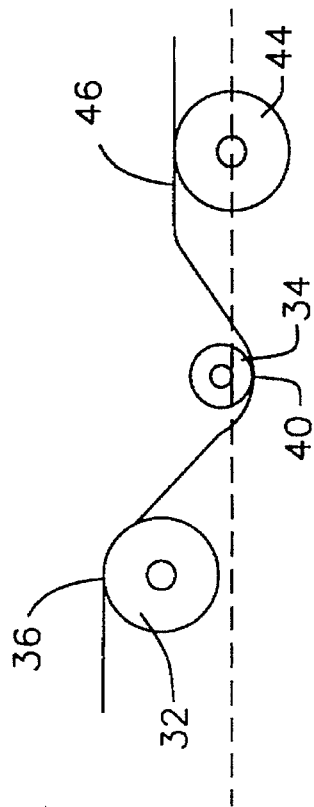
FIG. 4C is a side view of a further embodiment of the invention similar to FIG. 4A where the roller assembly is pitched at an angle so that the first roller is higher than the third roller.
Figure 4B:
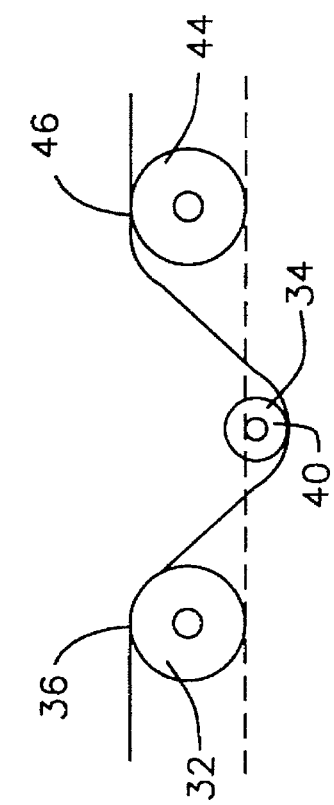
FIG. 4B is a side view of another embodiment of the roller assembly similar to FIG. 4A where the middle roller has a smaller diameter than the first and third rollers.

Referring to FIGS. 4A–4C, there is disclosed the roller assembly 42 with the second roller 34 below the level of the first and third rollers 32 and 44, respectively. As a consequence of this arrangement of the rollers, the food product undergoes curling so that an initially linear food product may be curled such as desirable for frozen shrimp.

In the specific embodiment shown in FIG. 4A, the upper surfaces 36 and 46 of the first and third rollers 32 and 44, respectively are positioned above the level of the liquid cryogen. The bottom surface 40 of the second roller 34 is positioned below the level of the liquid cryogen. As in the embodiments of the invention described in connection with FIGS. 2A, 2B and 3, the food product is in part shaped by the pressure exerted thereon by the bottom surface 40 of the second roller 34 and the conveyor belt 18.

In another embodiment of the invention, the diameter of the middle roller of the three roller assembly is less than the diameter of the first and third rollers. Referring to FIG. 4B, the middle roller 40 has a diameter less than either of the first and third rollers, 32 and 44, respectively. The smaller diameter of the middle roller 40 imparts a greater degree of curling to the food product and is particularly preferred for the curling of shrimp. For example, if a 2 inch diameter roll is used for the first and third rollers, a 1½ to 1¾ inch diameter roller, most preferably about a 1⅝ inch diameter roller can be used for the second roller to effectively impart a curled shape to shrimp.

The position of the roller assembly with respect to the entrance and exit of the freezer may vary. For example, the entrance and exit can be positioned at the same height to facilitate engaging the freezer to other conveyor systems for transporting the food product. Alternatively, the entrance and exit can be at different heights. As shown in FIG. 1, the entrance 8 lies above the exit 12 within the freezer 2. Accordingly, it may be desirable to angle the roller assembly downwardly so that the food product is lowered during its travel through the roller assembly. An example of this embodiment is shown in FIG. 4C.

Referring to FIG. 4C, the first roller 32 lies above the position of the third roller 44 whereby the food product moves downwardly from the surface 36 on the top of the first roller 32 to the top surface 46 of the third roller 44. As a result, the food product is readily transported from the higher entrance to the lower exit by the roller assembly. Conversely, if the entrance is lower than the exit, the roller assembly can be angled upwardly to facilitate transportation of the food product to the higher exit.

The present invention also encompasses a roller assembly capable of flattening a food product as shown in FIGS. 5A and 5B in which the middle roller is raised above the level of the first and third rollers.

Referring specifically to FIG. 5A, there is shown an embodiment of the three roller assembly in which the middle roller 34 lies above the level of each of the first and third rollers 32 and 44, respectively. The pathway defined by the surface 36 of the first roller 42 to the surface 40 of the second roller 34 and then to the surface 46 of the third roller 44 is straighter (i.e. less curvature) than the embodiments shown, for example, in FIGS. 3 and 4A. Accordingly, the roller assembly in FIG. 5A is suited to provide a flattened food product.

A greater flattening effect may be imparted to the food product through the embodiment shown in FIG. 5B. In this embodiment, the diameter of the middle roller 34 is less than the first and third rollers 32 and 44, respectively. By reducing the diameter of the middle roller, the curvature of the path of travel of the food product is reduced further and a flattened food product can thereby be obtained.

A further embodiment of the invention for obtaining a flattened food product is shown in FIG. 6. In this three roller assembly, all three rollers 32, 34 and 44, respectively are positioned at the same level within the immersion bath. However, the middle roller 34 has a diameter which is less than the first and third rollers, respectively.

The degree of freezing and how well the desired shape of the food product is retained is dependent on the residence time of the food product in the liquid cryogen. It is desirable to have at least 25%, preferably from about 25 to 75% of the second roller submerged in the liquid cryogen. Most preferably, about 50% of the second roller is submerged. The residence time of the food product in the liquid cryogen can be increased by reducing the speed of the conveyor belt 18 and/or by raising the level of liquid cryogen in the vessel 20 which raises the liquid level on the middle roller. It is also possible to increase the residence time of the food product within the liquid cryogen by lowering the position of the second roller 34 in the vessel 20.

The diameter of the rollers is important in providing the proper amount of pressure against the food product during its travel on the conveyor belt 18. Generally, the diameter of the rollers is directly proportional to the thickness or diameter of the food product. Preferably, the length of the food product is no greater than one-half of the circumference of the rollers to ensure that the food product does not remain on the surface of the second roller 34, but instead continues to travel on the conveyor belt 18.

Some food products may adhere to the second roller 34 during its travel through the liquid cryogen. In this event, a scraper or similar device may be mounted in proximity to the second roller to remove the frozen food product therefrom. Referring to FIG. 4A, a scraper 60 is provided proximate to the roller 34 at a position where the food product is carried away from the second roller 34 toward the third roller 44. Any food product which may adhere to second roller 34 is detached therefrom by the scraper 60. The detached food product then falls on the conveyor belt as it travels toward the third roller 44.

EXAMPLE

In a process of curling and then freezing shrimp using a roller assembly as shown in FIG. 4, the following parameters are employed to obtain a desirable product. The diameter of the first and third rollers is about 2 inches and the second roller is about 1 inch. The clearance between the conveyor belt and the second roller is about 5/16 inch. The speed of the conveyor belt is about 20 feet per minute.

We claim:

1. A method for at least partially freezing a food product in a preselected shape comprising:

a) transporting the food product on a conveyor belt to a vessel containing a liquid cryogen and a roller assembly;

b) before or during contact of the food product with the liquid cryogen, passing the food product on the conveyor belt into contact with the roller assembly to form the food product into the preselected shape; and c) contacting the food product on the conveyor belt with the liquid cryogen, wherein the food product is at least partially frozen in said preselected shape.

2. The method of claim 1 further comprising varying the speed of the conveyor belt to adjust the residence time of the food product in the liquid cryogen.

3. A method for at least partially freezing a food product in a preselected shape comprising:

a) transporting the food product on a conveyor belt within a vessel containing a liquid cryogen;

b) before or during contact of the food product with the liquid cryogen, passing the food product on said conveyor belt over a roller assembly comprising a first roller having an upper surface above the surface of the liquid cryogen; and c) passing the food product in shape-forming contact downwardly along a bottom surface of a second roller of the roller assembly lying below the surface of the liquid cryogen, wherein the food product is at least partially frozen into said preselected shape.

4. The method of claim 3 wherein the second roller is lower within the vessel than the first roller.

5. The method of claim 3 further comprising passing the food product upwardly along an upper surface of a third roller lying above the surface of the liquid cryogen.

6. The method of claim 5 wherein the second roller is positioned lower in the vessel than the first and third rollers.

7. The method of claim 6 wherein the diameter of the second roller is less than the diameters of the first and third rollers.

8. The method of claim 7 wherein the food product is curled.

9. The method of claim 6 wherein the food product is curled.

10. The method of claim 9 wherein the food product is shrimp.

11. The method of claim 5 wherein the diameter of the second roller is less than the diameters of the first and third rollers.

12. The method of claim 5 wherein the second roller is positioned higher in the vessel than the first and third rollers.

13. The method of claim 12 wherein the diameter of the second roller is less than the diameters of the first and third rollers.

14. The method of claim 3 wherein the roller assembly is at an angle with respect to the surface of the liquid cryogen.

15. The method of claim 3 wherein the length of the food product is no greater than one-half the circumference of each roller.

16. The method of claim 3 wherein the second roller is at least 25% submerged in the liquid cryogen contained in the vessel.

17. The method of claim 5 wherein the first, second and third rollers are at the same level within the vessel.

18. The method of claim 17 wherein the diameter of the second roller is less than the diameters of the first and third rollers.

19. Apparatus for at least partially freezing a food product in a preselected shape comprising:

a) a vessel containing a liquid cryogen;

b) conveyor means for transporting the food product through the vessel and around a roller assembly; and c) a roller assembly operatively connected to the vessel comprising at least two rollers forming a travel path for the conveyor means through at least a portion of the liquid cryogen.

20. The apparatus of claim 19 wherein the roller assembly comprises at least two rollers, said conveyor means extending over an upper surface of a first roller and around a bottom surface of a second roller.

21. The apparatus of claim 20 wherein the upper surface of the first roller is positioned above the surface of the liquid cryogen and the bottom surface of the second roller is positioned below the surface of the liquid cryogen.

22. The apparatus of claim 21 further comprising a third roller.

23. The apparatus of claim 22 wherein the third roller has an upper surface positioned above the surface of the liquid cryogen.

24. The apparatus of claim 22 wherein the second roller is positioned lower in the vessel than the first and third rollers.

25. The apparatus of claim 24 wherein the second roller is at least 25% submerged in the liquid cryogen.

26. The apparatus of claim 22 wherein the length of the food product is no greater than one-half the circumference of the second roller.

27. The apparatus of claim 22 wherein the diameter of the second roller is less than the diameter of the first and third rollers.

28. The apparatus of claim 22 wherein the second roller is positioned higher in the vessel than the first and third rollers.

29. The apparatus of claim 20 wherein the second roller is positioned lower in the liquid cryogen than the first roller.

* * * * *